Figure 1:
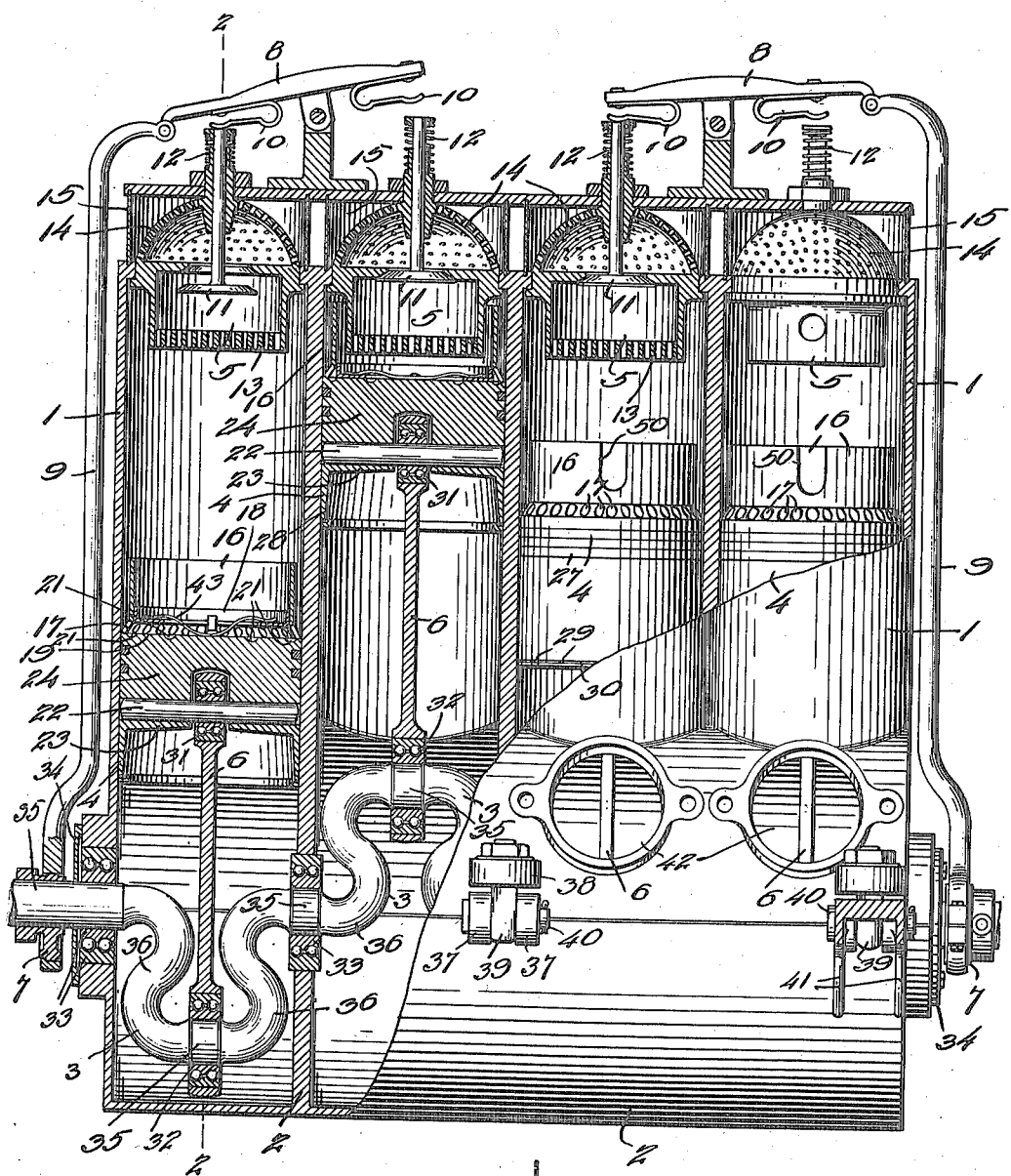

T. B. SLATE.
INTERNAL COMBUSTION ENGINE.
APPLICATION FILED OCT. 28, 1915.

1,286,435.

Patented Dec. 3, 1918.
4 SHEETS—SHEET 1.

Witnesses

Inventor
Thomas B. Slate,
Jerry A. Mathews,
Attorney

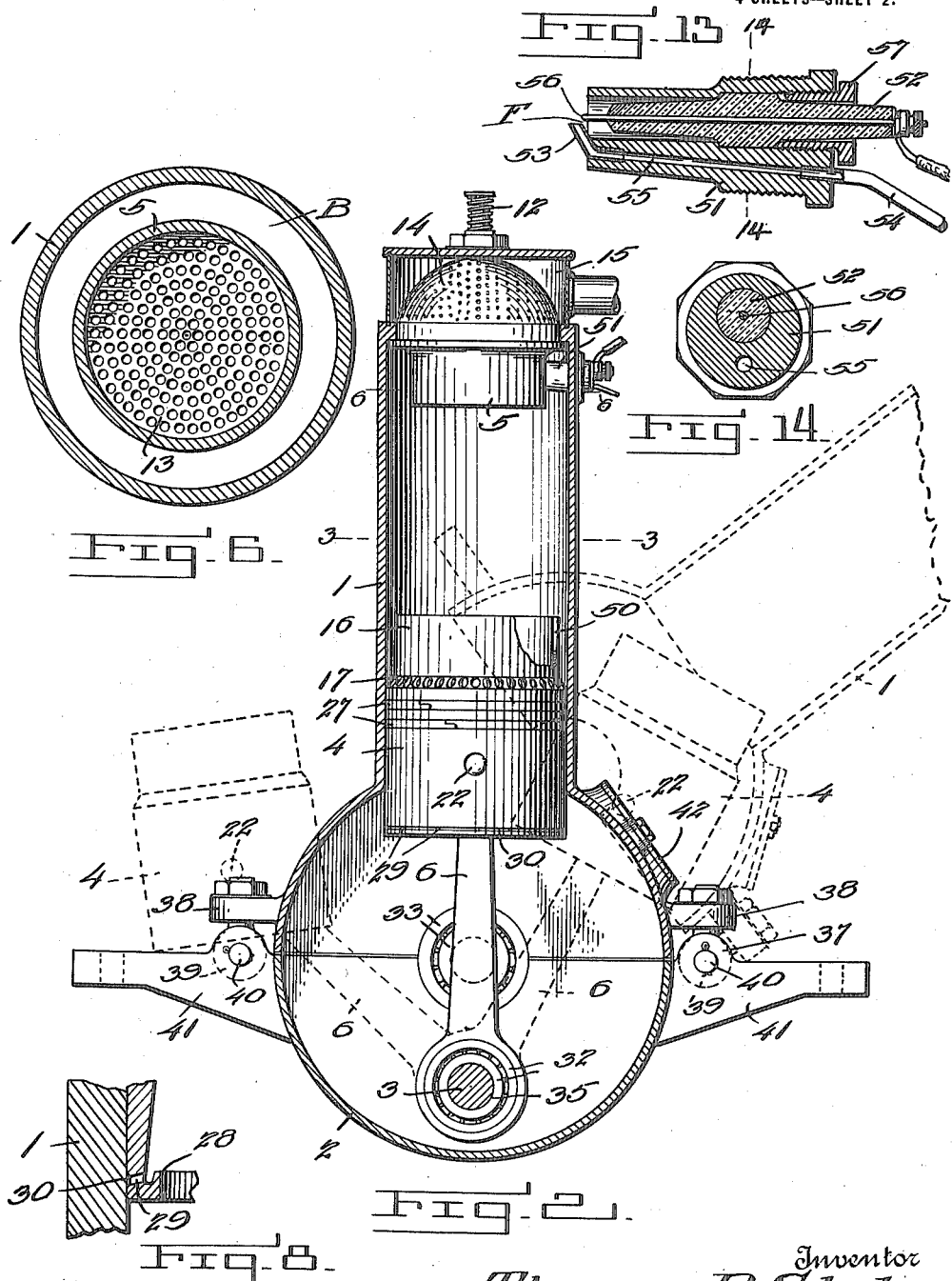

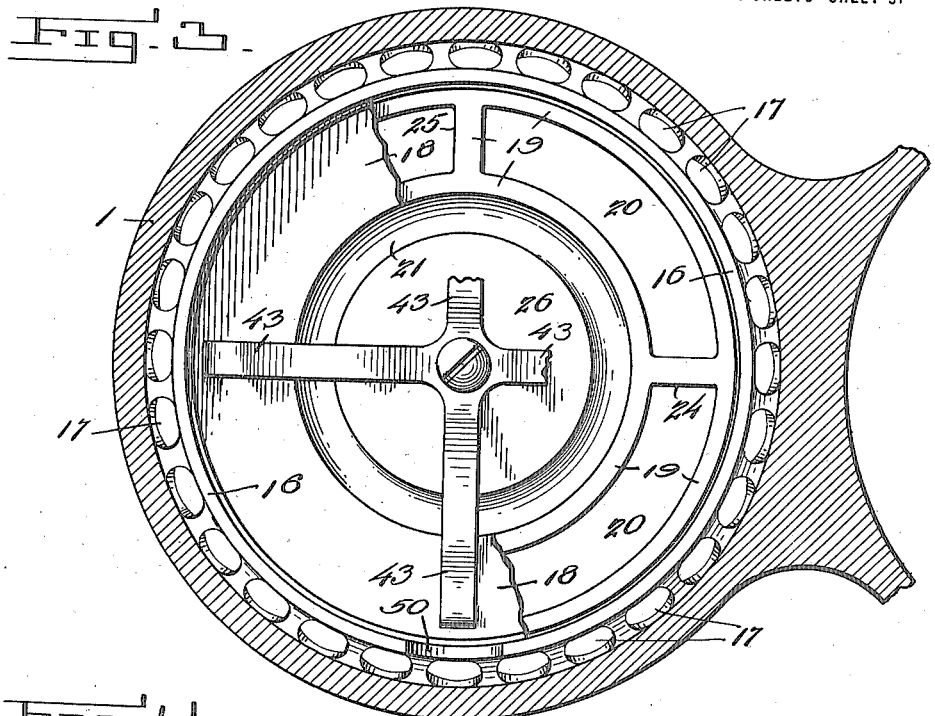
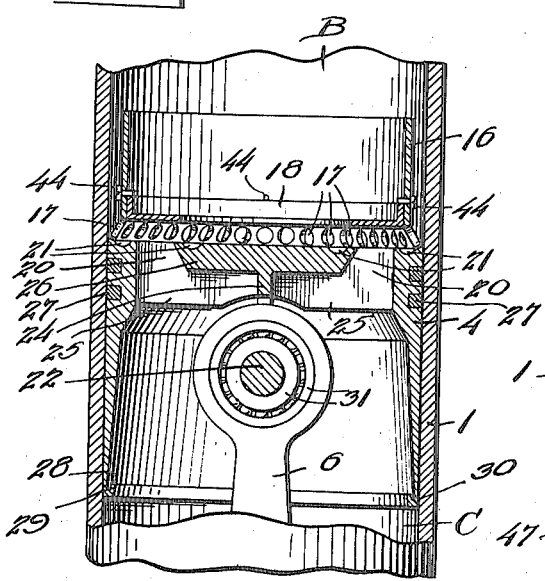
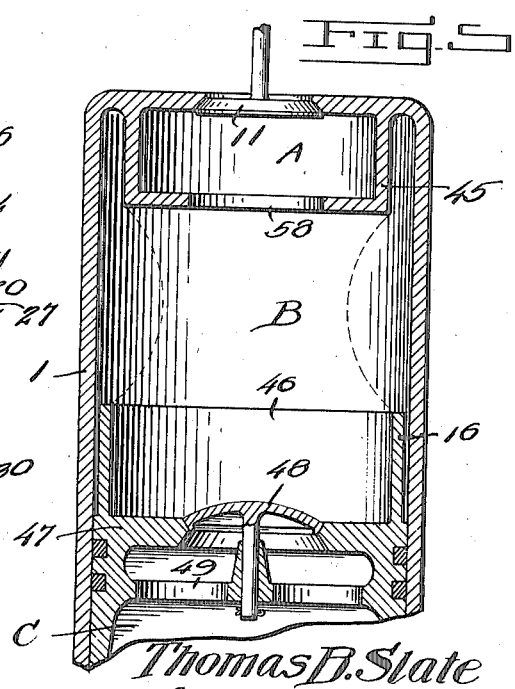

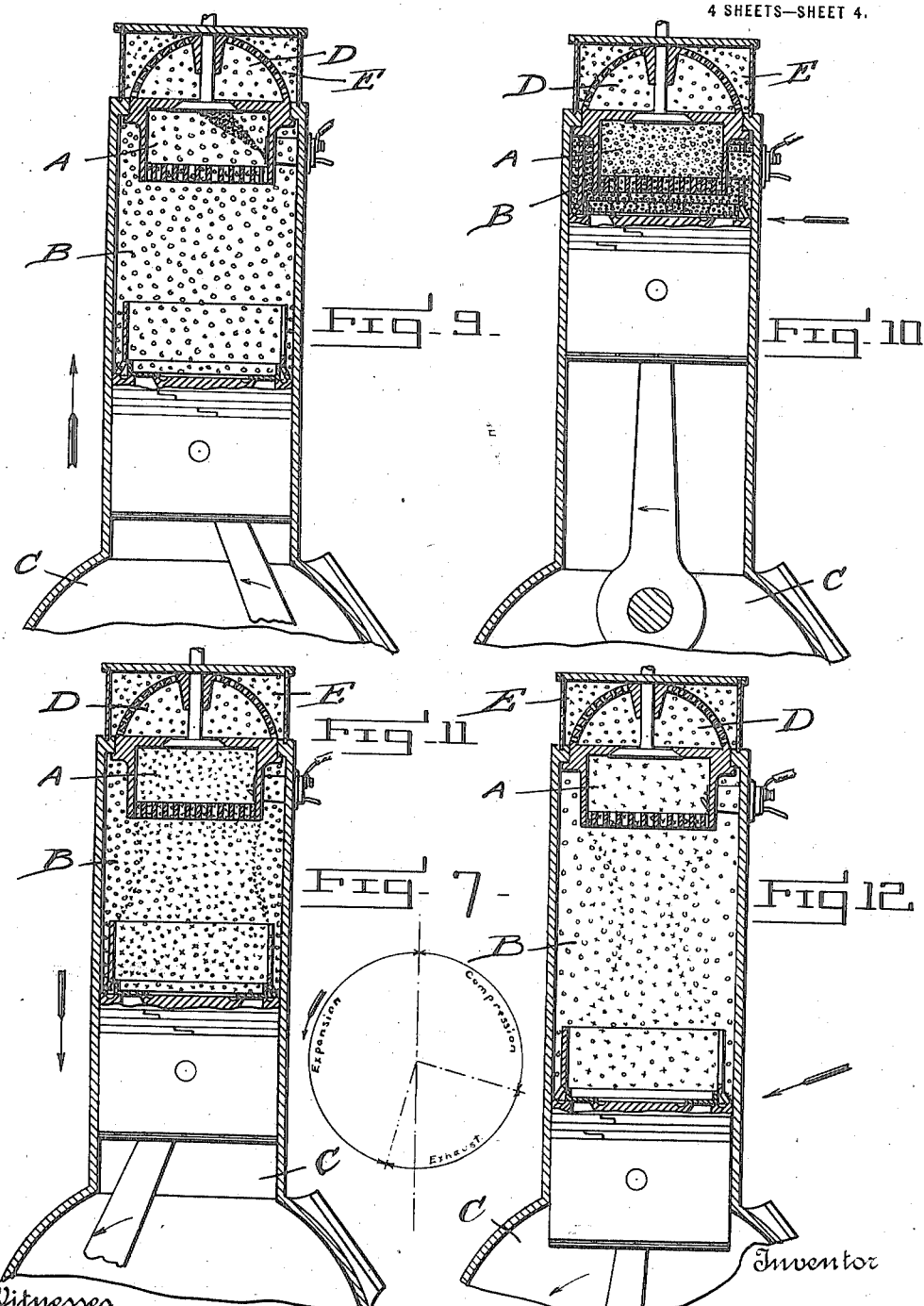

UNITED STATES PATENT OFFICE.

THOMAS B. SLATE, OF RICHMOND, VIRGINIA, ASSIGNOR TO AMERICAN MECHANICAL IMPROVEMENT COMPANY, OF WASHINGTON, DISTRICT OF COLUMBIA, A CORPORATION OF WEST VIRGINIA.

INTERNAL-COMBUSTION ENGINE.

1,286,435. Specification of Letters Patent. Patented Dec. 3, 1918.

Application filed October 28, 1915. Serial No. 58,310.

*To all whom it may concern:*

Be it known that I, THOMAS B. SLATE, a citizen of the United States, residing at Richmond, in the county of Henrico and State of Virginia, have invented a new and useful Internal - Combustion Engine, of which the following is a specification.

My invention relates especially to a novel and economical internal combustion engine, the object of which is to convert the greatest possible amount of heat into power, and to save and utilize the heat passing through the walls of the cylinder by means of air strata. It is also my object to effect improved lubrication thereby preventing friction. It is an important object of my invention to simplify construction and greatly decrease the cost of manufacture, at the same time increasing the efficiency of the engine. It is also my object to provide an engine of the greatest power, occupying the smallest possible space, and capable of adaptation to all uses, such as in aeroplanes, automobiles, motorboats, and all types of heavy duty engines, such as for tractors and heavy marine uses.

It is also my object to provide an engine of comparatively smooth and noiseless operation.

It is a further object of my invention to provide cylinder castings which do not require cumbersome water jacketing or cooling flanges of any description, nor any other external cooling device, nor fans or the like.

It is a further object of my invention to provide improved cylinder castings having the outer surfaces straight, whereby the walls of the cylinder are more easily and perfectly cast. This is made possible by the elimination of water jackets and cooling flanges.

It is a further object of my invention to provide a novel piston having internal air ports disposed in a novel position in proximity to the outer walls of the piston for the purpose of cooling packing rings, and thereby providing a cool piston surface in contact with the lubricated walls of the cylinder and protecting it from the injurious action of heat.

It is a further object of my invention to provide a novel circular valve for the head of the piston to permit of the passage of air evenly in a circular form and its even distribution over the area of the cylinder.

It is a further object of my invention to provide a novel type of combustion chamber and to dispose of it in a novel position internally of the engine cylinder or expansion chamber, and to provide a novel annular air space or chamber between the walls of the combustion chamber and the expansion chamber or cylinder, protecting the latter walls from heat of the combustion chamber. It is a further object of this improvement in the combustion chamber to incorporate a novel muffling dome adapted to lessen the noise of exhaust and also to retain a body of cold air for novel cooling of that portion of exhaust valve exterior to combustion chamber.

It is a further object of my invention to provide an engine having a short compression stroke and a long expansion or power stroke, expanding the products of combustion to as near atmospheric pressure as possible, producing the greatest amount of power from a given amount of fuel.

A further important object is the provision of an engine capable of operating on any type of fuel oil, distillate or gasolene.

It is a further object of my invention to discharge all of the products of combustion from the cylinders to obtain the greatest amount of power from the new charge of gas taken into the combustion chamber. It is a further object of this improved type of engine to use the two-cycle principle, getting a power stroke to each revolution of the crank shaft for each cylinder without the disadvantages of the ordinary two-cycle type.

It is an object of my invention to retain a stratum of air interposed between the piston deflector and the walls of the cylinder to prevent the products of combustion from coming in contact with the walls of the cylinder and to thereby increase the life of the packing rings by the elimination of friction which would result from deposits of carbon were it not for the interposed stratum of air.

It is a further object of my invention to provide an improved spark plug of novel design, with a fuel channel and fuel nozzle for the purpose of passing the fuel oil through the spark plug to the combustion chamber. The object of the novel construction of my improved spark plug is to cool the plug by the passage of cold oil through the shell of the plug and to raise the temperature of the fuel oil passing through the shell of the plug before it is admitted to the combustion chamber. It is a further object of this plug to throw the oil from the fuel nozzle directly onto the exhaust valve for the purpose of cooling the same, also to vaporize the fuel in combustion chamber.

It is also an object of my invention to provide various novel improved combinations of elements and a novel arrangement and disposition of parts as more fully hereinafter set forth and claimed.

I attain the objects of my invention by the mechanism illustrated in the accompanying drawings, in which—

Figure 1 is a view of a four-cylinder engine embodying my invention, shown partly in section and partly in elevation, with a portion of the walls broken away to expose the crank shaft; Fig. 2 is a vertical section on line 2—2 of Fig. 1, with dotted lines illustrating the crank case in opened position and the piston in position to be removed, and also the piston after removal from the cylinder; Fig. 3 is a horizontal section on line 3—3 of Fig. 2; Fig. 4 is a vertical section of a modified form of my invention showing means replacing the spring mechanism shown in Fig. 3 to control the valve in the piston; Fig. 5 is a vertical section of a modified form of combustion chamber construction, with dotted lines indicating the theoretical relative position of air stratum and products of combustion; Fig. 6 is a horizontal section on line 6—6 of Fig. 2, looking down; Fig. 7 is a diagrammatic view of the engine cycle, showing positions of crank relative to opening and closing of valves; Fig. 8 is an enlarged detail of piston lubrication means; Figs. 9, 10, 11 and 12 are vertical sectional views showing in diagram the position and relation of strata of air, combined air and gas, and products of combustion, at different stages in the cycle. In these four diagrammatic figures, air is designated by small circles, the smallest circles indicating compressed air and the larger circles expanded air; the products of combustion are designated by crosses; mixtures of air and the products of combustion are designated by a combination of crosses and circles; combustible mixture consisting of fuel vapor and compressed air is designated by a combination of circles and dots; and fuel, by heavy dots; Fig. 13 is a longitudinal section of my improved spark plug; and Fig. 14 is a cross section on line 14—14 of Fig. 13.

Like characters of reference designate like parts throughout the several views.

I provide an engine in the structure of which the following-named elements are incorporated in a suitable manner, as will be understood by reference to the accompanying drawings and subsequent description:

Cylinder casting 1 and crank case casting 2 are arranged, as shown, with a crank shaft 3 suitably mounted therein. Piston 4 and valve cage forming an internal combustion chamber $A^5$ are removably mounted in cylinder casting 1. Piston 4 is attached to crank shaft 3 by connecting rod 6. Suitable cams or eccentrics 7 are arranged on crank shaft 3 as illustrated in Fig. 1, and a connecting rod 9 connects cam 7 with a suitable rocker arm 8, to which are attached suitable rocker arm springs 10. Springs 10 are adapted to contact with the valve members 11 as illustrated in Fig. 1. An exhaust valve spring 12 is arranged to exert an upward resilient action on valve 11. A novel combustion chamber grate 13 and a novel muffling dome 14 are disposed as illustrated in Fig. 1. Above muffling dome 14 is an exhaust member 15. Piston 14 has a novel offset, and an annular deflector 16 through the base portion of which are spaced valve openings 17.

Referring to Figs. 1 and 4, it will be observed that I provide a novel valve on the end of piston, designated by 18. In the modified form of my invention, illustrated in Fig. 4, it will be observed that I provide piston valve openings 20, annularly disposed relative to end piston plate 26. To a piston pin 22 is attached connecting rod 6, the piston pin being supported by a boss 23.

Integral with the boss 23 I provide suitable cross-webs 24. The piston has suitable packing rings 27. Annularly mounted interiorly of the lower portion of the piston is a novel annular piston oil trough 28, having lubrication orifices 29, through which the oil may flow to the cylinder from oil groove 30. The piston is provided with ball piston bearings 31. The connecting rod is similarly provided with ball bearings at crank shaft designated by 32. 33 designates ball bearings for the crank shaft as illustrated in Fig. 1, adjacent to which is mounted a suitable packing plate 34. The crank journals are designated by 35, the crank web 36 being of novel S-shape, as illustrated in Fig. 1.

Referring to Figs. 1 and 2, it will be observed that hinge lugs 37 are mounted on bracket support 41 of crank case 2, and that corresponding hinge lugs 38 are mounted on cylinder casting 1. A hinge pin 40 extending through a suitable eye bolt 39 makes possible a pivotal connection of the cylinder casting 1 to the crank case 2 on opposite sides of the engine to permit of getting into the interior of the engine from either side without inconvenience. Suitable intake valves 42 are arranged as disclosed in Fig. 1.

Referring to the novel piston construction disclosed in Fig. 1, 43 designates a piston valve spring, resiliently engaging member 18. In the modified construction shown in Fig. 4, 44 designates stop screws for piston valve 18 which serve a substantially similar purpose to spring 43 in the other form of my invention.

Referring to Fig. 5, 45 designates a modified combustion chamber which is integral with the cylinder casting instead of being a removable separate casting, as is the case in the primary form of my invention. 46 designates the deflector for modified piston 47 as shown in Fig. 5, and 48 designates a modified piston valve mounted in a modified piston web 49.

Referring to Fig. 2, it will be observed that a portion of the deflector 16 is broken away to show slot 50 which is positioned to accommodate a fuel nozzle or spark plug, when the piston is at the extreme upper end of the cylinder. 51 designates fuel nozzle and spark plug shell, 52 designates a suitable porcelain insulating member eccentrically mounted in member 51, 53 designates a fuel nozzle, opening out of an eccentrically disposed fuel channel 55, through which fuel is fed from fuel pipe 54, as shown in detail in Fig. 13, and 57 designates a packing nut. 56 designates a suitably insulated sparking element of usual construction. F designates the spark gap.

Referring again to Fig. 5, 58 designates the combustion chamber opening, in the modified form of my invention.

Especial attention is directed to diagrammatic Figs. 9, 10, 11 and 12, in which the combustion chamber, mounted at one end of the cylinder, is designated by A; the expansion chamber of the cylinder is designated by B, and the crank case chamber by C. D designates a muffling dome chamber adjacent to the combustion chamber A, and E designates an exhaust chamber, which is separated from muffling dome chamber D, by muffling dome 14.

My engine operates as follows:

Referring to Fig. 9, and starting with the piston at the position shown in that figure, exhaust valve has just closed and compression of air begins. Also injection of fuel into combustion chamber A, as shown in Fig. 9, takes place at this time. (The circles in combustion chamber A and expansion chamber B designate pure air. The heavy dots in combustion chamber A extending from fuel nozzle to exhaust valve designate fuel oil being admitted to combustion chamber.) As the piston travels upward, compressed air passes through grate 13 and mixes with fuel in combustion chamber A.

Referring to Fig. 10, when compression is complete as shown in that figure, the combustion chamber A is filled with a combustible mixture of air and gas, illustrated by combined circles and dots. Expansion chamber B is filled with compressed air (as shown by small circles in Fig. 10), surrounding internal portion of combustion chamber A. At this stage ignition takes place in combustion chamber A. The exploding mixture passing through grate 13 and mixing with air directly under grate passes part way up on outside of combustion chamber compressing remainder of air to a considerably higher pressure. The products of combustion as shown in Figs. 11 and 12 are designated by crosses.

On the downstroke of piston the absorption of heat by the air in contact with the flame and surrounding the walls of valve cage 5, causes the air to expand, thus driving the products of combustion radially toward the center of expansion chamber B. This results from the increase in the volume of air due to the absorption of heat from the products of combustion and from the decrease in the volume of the products of combustion due to the radiation of heat to the stratum of air. The expansion of the air forces the air stratum to follow the piston on its downward stroke adjacent to the cylinder walls as shown in Fig. 11.

Referring to Fig. 11, it can readily be seen that the air stratum is located adjacent to the walls of the cylinder which is thus protected from the heat of combustion by the expansion of air which is continuously absorbing heat and expanding to greater volume. The absorption of this heat of combustion by the stratum of air has a tendency to contract the volume of the products of combustion, therefore driving the line of division between the air and products of combustion toward the center of the cylinder from all sides, as is illustrated in Fig. 12. The absorption of heat in expansion chamber B and contraction of the products of combustion is replaced by the expansion of air that absorbs said heat of combustion, thereby keeping up maximum pressure on piston.

Referring to Fig. 12, at this stage of the operation the crank is at about 165 degrees or 15 degrees off center. The exhaust valve 11 opens and relieves any remaining pressure in combustion chamber A and expansion chamber B. Crank case compression in crank case chamber C forces piston valve 18 off its seat, allowing the pure air compressed in the crank case to pass through from chamber C to chamber B.

Piston valve 18 immediately closes on the beginning of upstroke of piston. This upstroke of piston creates a vacuum in crank case chamber C and thereby opens automatically the intake valve 42, allowing crank case chamber C to refill during upstroke of piston with a fresh charge of pure air. Member 42 is a suitable automatic valve, not illustrated in detail. Exhaust valve 11 remains open during upstroke of piston to the point of beginning, indicated in Fig. 9, discharging all remaining products of combustion in expansion chamber B, combustion chamber A and muffling dome chamber D. The point of closing of exhaust valve may be varied according to the amount of heat remaining in muffling chamber D. Also it may be varied for the purpose of varying compression in expansion chamber B and combustion chamber A, depending on the quality of fuel used, to get best results and prevent pre-ignition as a result of the heat of compression. The changing of time of closing of exhaust valve 11 changes amount of air to be compressed or varies compression stroke, thereby changing the amount of compression.

The object of discharging the products of combustion or heat from muffling dome chamber D is to leave the outer exposed surface of exhaust valve 11 exposed to cold air for the purpose of keeping exhaust valve 11 cold. This outer exposed surface of exhaust valve 11 is exposed to cold air about four-fifths of the time, while the valve is exposed to heat only about one-fifth of the time. Exhaust chamber E and muffling dome chamber D are separated by dome 14. The contents of muffling dome chamber D is composed of pure air and not the products of combustion, the air discharging the products of combustion.

The passage of the air through grate 13 and combustion chamber A is so rapid that but little heat is absorbed by this air.

Deflector 16 on piston 4 operates to prevent the products of combustion from going to the walls of the cylinder at the time of ignition. This deflector has a slot 50 to allow the deflector to pass the spark plug at top or extreme of piston stroke. The upturned portion of annular piston valve 18 operates to cover deflector valve openings 17 when valve is down, to prevent the products of combustion at time of combustion from passing around through deflector valve openings 17 to walls of cylinder, thereby acting as part of deflector 16 to turn the products of combustion up on outside of combustion chamber A and inside of deflector 16, bringing them in direct contact with air stratum that protects the walls of cylinder.

The purpose of uncovering valve openings 17 in lower portion of deflector 16 is to discharge or replace air stratum surrounding deflector 16 at each discharge of the air from crank case chamber C to expansion chamber B. When valve 18 is in raised position as shown in Figs. 1 and 4 the valve openings 17 and main valve openings 20 are in operative communication with each other allowing the passage of air through main valve openings 20 and deflector openings 17. This permits of the passage of air on outside of deflector 16 as well as inside of the deflector.

Piston valve openings 20 provide a passageway for air directly inside of and adjacent to piston wall. One object of this positioning of the openings 20 is to cool the outer wall of piston and the packing rings. The piston in passing rapidly over the walls of the cylinder prevents the walls of the cylinder from becoming heated and protects the lubrication of the packing rings on the walls of cylinder, thereby eliminating friction and maintaining perfect lubrication. This particular type of valve opening gives an equal distribution of the flow of air from crank case chamber C to expansion chamber B. Piston valve 18 is resiliently held in position by a suitable spring 43, as illustrated in Figs. 1 and 3.

Referring to Fig. 4, this figure discloses a modified form of construction for holding piston valve 18 in position, consisting of stop screws 44. In this form, piston valve 18 reseats itself of its own weight, without employing springs 43.

The cross web 24 shown in cross section in Fig. 4 is integral with piston pin boss 23, thus strengthening the piston structure.

Referring to Figs. 4 and 8, I provide a novel annular piston oil cup 28 in which collects the splash oil from the crank case. The oil flows from annular cup 28 through the spaced lubrication orifices 29, of which there are several, to the oil groove 30 positioned annularly on the outer wall of the cylinder, as illustrated in Fig. 8, to facilitate lubrication. It is within the contemplation of my invention to position the annular oil cup 28, oil groove 30 and connecting orifices 29 at any suitable portion of the piston and not necessarily at its extreme lowermost portion as illustrated in the drawings. It is also within the contemplation of my invention to provide a plurality of such oil cups, oil grooves and connecting orifices, positioned at spaced portions of the piston, as for example one at the extreme bottom portion as shown in the accompanying drawings and a similar cup groove and orifices at about the central portion of the piston.

Referring to Fig. 1, in the bottom of valve cage 5 and combustion chamber A (see Fig. 9) is a grate 13. This grate 13 separates combustion chamber A and expansion chamber B, communication between the two chambers being afforded by series of openings or channels through the grate. The combustible mixture being contained in chamber A the passing of air through grate 13 from expansion chamber B to combustion chamber A on upstroke of piston prevents the mixing of gas from combustion chamber A with air in expansion chamber B. Grate 13 is exposed to extreme heat immediately after combustion takes place as the flame and products of combustion pass through it, and it absorbs a considerable amount of heat during the expansion or power stroke of piston. The grate radiates the heat into the air passing from expansion chamber B to combustion chamber A during the compression stroke, and the raising of the temperature of the air has the effect of facilitating vaporization of the fuel as it is injected into the chamber.

Referring to Fig. 5, it presents a modified structure both as to the combustion chamber and piston valve construction. This modified type of structure is especially adapted to high pressure engines and especially to engines using heat of compression for ignition purposes. Combustion chamber A in the modified structure disclosed in Fig. 5 has a single large central opening 58 in bottom of combustion chamber. This particular form of opening from combustion chamber A to expansion chamber B has a tendency to throw the products of combustion farther from the walls of the cylinder, making it possible to use a thin inner air stratum around outside of combustion chamber.

In the modified form shown in Fig. 5 higher compression is possible because of the lessening of air stratum between deflector 16 and walls of the cylinder and between the walls of combustion chamber 45 of Fig. 5 and deflector 16, and the further lessening of the volume of combustion chamber A in this form by reason of the shorter perpendicular walls of that chamber. In consequence of this construction the piston stroke can be lengthened or piston allowed to go nearer end of expansion chamber A, creating higher compression.

In my improved type of engine a stratum of air adjacent to the piston protects the packing rings from any deposit of carbon which would tend to produce friction. The outer portion of my piston is exposed to air compression only and the products of combustion never come in contact with it, or with the portion of the walls of the expansion chamber over which the piston and packing rings travel. Consequently there is an elimination of friction which would result were there deposits of carbon possible.

Referring to Fig. 1, I provide eccentrics 7 attached to the crank shaft. Their object is to do away with the usual cam shaft and cam gears. These eccentrics 7 are fastened to crank journals 35 by means of suitable set screws. They are set at the proper angle to open and close exhaust valves at the proper time. The two exhaust valves 11 operatively connected with an eccentric 7 have a directly reverse operation. One rocker arm 8, one eccentric 7 and one connecting rod 9 are operatively connected and arranged to keep two valves 11 in operation, thus making one eccentric, one rocker arm and one connecting rod sufficient for a two cylinder engine. I provide springs 10 on rocker arm 8. The object of employing springs 10 is to facilitate a noiseless operation of these valves. I also provide springs 12 adapted to exert pressure to reseat valves 11. Spring 12 is much weaker than spring 10, so that the valve opens very readily on coming in contact with spring 10. This feature is advantageous, but not an essential feature to the operation of my engine.

My improved eccentrics mounted directly on the crank journals 35 take the place of eight times their number of cams for the same number of power impulses in the ordinary types of four-cycle motors in common use. In consequence I effect an important reduction in the cost of construction, and also effect an important improvement by overcoming the loss of power due to friction. My novel construction and process of air stratification reduces the weight for a given horsepower and likewise reduces the space required by the motor owing to the elimination of a radiator, of flanges for cooling purposes, of a fan, and of a cold water jacket. In the operation of my engine I obtain all of the features of advantage of the four-cycle engine over the two-cycle type of motor, such as the more effective discharge of the products of combustion and greater expansion of the products of combustion. Furthermore, it will be observed that I have dispensed with the usual ports around piston, which are an objectionable feature of the ordinary two-cycle type of engine because of the necessity of running piston packing rings over port openings in cylinder walls in such engines when of usual construction.

Referring to Fig. 2, the cylinder casting 1 is shown in closed position, and by dotted lines in open position. Likewise the piston is shown by dotted lines in partially removed position, and also in position after removal. All wearing parts are most easily accessible for the purpose of inspecting and renewing in my improved crank case, by reason of the hinging of cylinder casting 1 to crank-case casting 2. I provide eyebolts 39 adapted to rotate on pins 40, which pass through hinge lugs 37 and bracket supports 41 on crank case casting 2. Eyebolts 39 are releasably secured to hinge lugs 38 by suitable nuts, lugs 38 being secured to cylinder casting 1. Members 37, 38 and 41 are integral with the castings from which they project. The crank case is opened by removing nuts from eyebolts 39, when the cylinder casting 1 may be tilted up from one side. It may be opened from whichever side it is desired to gain access to the interior of the engine. The pivotal connection or mounting of cylinder casting 1 and crank case casting 2 is alike on opposite sides. The cylinders can be tilted either to the position shown in dotted lines in Fig. 2 or to a similar position in a reverse direction.

Hinge pin 40 is disposed in line with edge of crank case casting, and causes crank case to lift from suitable gasket or packing between crank case casting 2 and cylinder casting 1, without injuring said gasket or packing. This operation, when pistons are removed exposes every bearing of crank shaft and connecting rods for inspection or replacement. It also eliminates all the objectionable features attendant upon the opening of crank case castings in engines of ordinary construction and the liability of the operator receiving oil on his person when he undertakes to inspect the interior of the ordinary engine.

Referring to Fig. 1, a portion of the crank case casting 2 is shown broken away to expose the crank shaft 3, which is of the novel shape illustrated. In this new design of crank shaft the crank journals 35 are larger than the S-shaped crank webs 36. This construction allows for spring and contortion of shaft to be equally distributed from one journal to the other, preventing the crystallization and breaking of crank shaft which is liable to occur in crank shafts of the ordinary type. The advantage of my novel design of crank shaft over the types of crank shaft in common use is that it is larger and stronger in the bearings, while in crank shafts heretofore devised the shaft is smaller in the bearings, resulting in crystallization and breaking at the bearings. The peculiar shape of my crank shaft allows the bearings to be put in place readily by passing the bearings along the shaft from one position to another. Thus, the bearings located at the center of the shaft are passed around over the locations for the other bearings to their own proper locations, thus saving time in examining or replacing bearings. The S-shape of the crank webs 36 is important because the shocks from the engine explosions are absorbed by the springing or cushion effect of the crank shaft, due to its uniformly curved webs, its greater length between bearings, and the relatively smaller diameter of the webs.

Referring to Figs. 13 and 14, I provide the novel type of fuel nozzle illustrated, and which is especially adapted to the use of this engine. I provide a shell 51, which is of novel form, thereby providing room for my novel fuel channel 55. The fuel is passed through the fuel nozzle shell for the purpose of keeping down the temperature of spark plug to prevent cracking of porcelain, and for the further purpose of raising the temperature of the fuel as it passes through the plug, thereby facilitating vaporization. Fig. 14, it will be observed, is a cross section of Fig. 13 on line 14—14 and shows how by reason of the location of the fuel channel in proximity to the insulated spark plug member the latter is prevented from overheating. The spark gap F between the insulated member of the spark plug and end of fuel nozzle is for the purpose of creating an electric spark at a point where there will always be sufficient gas for ignition no matter how small the amount of fuel injected into combustion chamber A. The location of the spark gap F, as illustrated, operates to cool the sparking points which might otherwise overheat and cause pre-ignition of gases. I provide a suitable fuel pipe 54 leading from channel 55 to a fuel pump of any suitable design (not illustrated), such as is now in common use, preferably one of the governor type controlling the amount of fuel ejected at each revolution of the crank shaft.

The fuel nozzle above described extends through a portion of the expansion chamber B and into combustion chamber A, and by reason of its relation to these chambers is particularly advantageous in the particular type of engine disclosed in the specification.

Especial attention is called to Figs. 9, 10, 11 and 12 illustrating diagrammatically the conditions prevailing within my engine at different stages of its operation. My invention involves a novel process of advantageous air stratification, the air stratum operating to absorb heat. It is recurringly interposed between the walls of the cylinder and the central area containing the products of combustion. The heat formerly lost through the cylinder walls is now absorbed by the air stratum and transformed into power exerted on the piston by reason of the expansion of the air. This process can be carried out most advantageously in my opinion with the structures illustrated in the accompanying drawings but is not necessarily dependent on same. The essential steps are the compression of air at one end of the expansion chamber in an annular area adjacent to its inner walls; the explosion of a combustible mixture within an internal combustion chamber which is in communication with the expansion chamber or cylinder; and the expansion of such air stratum simultaneously with the expansion of the products of combustion, with the air stratum interposed between the walls of the cylinder and the products of combustion, thereby protecting the walls from the products of combustion.

It should be understood that this method is not a "cooling" of the cylinder in the sense the term is customarily employed, but is a method of obviating the necessity for any of the usual cooling devices by interposing an air stratum adjacent to the inner walls of the engine so that the products of combustion at no time come in contact with and heat them as has been usual with engines heretofore devised. The only heat absorbed by the walls of cylinder in my engine is that which radiates through air stratum, and that air stratum is completely changed at every revolution of the crank shaft or several hundred times a minute, thus minimizing the amount of radiation through the air stratum to the walls of the cylinder.

The absorption of heat which in other engines pass through walls of cylinder is now performed by the air stratum, and this operation expands the air stratum, thus converting the heat into power applied to the piston. Thus not only is the heat saved and absorbed instead of being wasted on the cylinder walls, by the method disclosed, but a further advantage is attained in consequence of reducing the temperature of exhaust by subjecting the products of combustion to their equal, approximately, of comparatively cool air, thereby considerably reducing the waste heat or power otherwise passing out through exhaust.

My method of stratification in internal combustion engines is entirely new in its result. Stratification was guarded against in early types of internal combustion engines, on account of its not being advantageously located or confined to the proper locations in cylinder. On that account it was considered detrimental and later eliminated by improved types of engines and carburetion of gas and air mixtures. The separation of my air stratum from the gas mixtures makes it noncombustible and enables it to perform the new functions claimed for it.

What I claim is:

1. In an internal combustion engine, the combination of an expansion chamber, an internal combustion chamber to effect complete combustion of fuel within the combustion chamber without consuming the volume of oxygen contained in air exterior to said chamber, said chamber being positioned within and having its lateral walls parallel with and spaced from the walls of the expansion chamber and having a grate portion interposed between the aforesaid chambers.

2. The combination of an expansion chamber, an internal combustion chamber positioned within and having its lateral walls substantially separated by an annular air space from the walls of the expansion chamber, a piston having an annular deflector with valve-controlled openings therein positioned to project into the space about midway between the walls of the aforesaid chambers, and the aforesaid valve controlled means for the passage of air through the piston being located at portions distant from its center and substantially adjacent to the walls of the piston to cool the piston and the piston packing rings.

3. The combination of an expansion chamber, an internal combustion chamber positioned within and having lateral walls parallel with and substantially spaced from the walls of the expansion chamber, a grate element interposed between the aforesaid chambers, valve-controlled exhaust means in communication with the internal combustion chamber, and noise-silencing mechanism in operative relation therewith.

4. In an internal combustion engine, an expansion chamber, a removable valve cage comprising an internal combustion chamber having a grate portion to prevent combustion in expansion chamber, and having an exhaust valve opening opposite the grate portion, and means supporting the aforesaid combustion chamber within the expansion chamber.

5. The combination of a valve cage constituting a combustion chamber and having openings disposed in the opposite ends thereof, an exhaust valve within the valve cage controlling openings from combustion chamber to exhaust, means for scavenging the expansion chamber through combustion chamber to exhaust, an expansion chamber, and a perforated dome integral with the valve cage adapted to retain scavenging air within the chamber formed by the dome, whereby to cool the exterior of exhaust valve.

6. An internal combustion engine having an exhaust valve, an exhaust chamber in operative communication with the engine cylinder, means for introducing air into the cylinder, and a perforated dome adapted to retain scavenging air within the chamber formed by the dome, whereby to cool the exterior of exhaust valve, substantially as set forth.

7. A piston having an annular longitudinally-extending deflector spaced substantially apart from the circumferential walls of the cylinder, said deflector having valve-controlled openings at the lower portion thereof communicating with the space exterior to the deflector to permit of the passage of scavenging air exterior to the deflector.

8. A piston having a deflector spaced substantially apart from walls of expansion chamber to maintain an annular air space, and having openings disposed in the lower portion thereof communicating with the aforesaid annular air space and valve means for closing said openings at a predetermined time.

9. In an internal combustion engine, an expansion chamber, a combustion chamber having a grate member interposed between the chambers, an exhaust chamber communicating with the combustion chamber, a valve for the exhaust chamber, a perforated dome member to retain cool air exterior to the exhaust valve and to reduce noise following expulsion of the products of combustion.

10. In an internal combustion engine, a combustion chamber, an exhaust chamber communicating therewith, an exhaust valve controlling passage of exhaust to exhaust chamber, a spark plug having a fuel nozzle associated therewith said nozzle being positioned to direct the flow of fuel onto the exhaust valve, whereby to lower the temperature thereof.

11. In an internal combustion engine, an internal combustion chamber having a grate member, the grate having its openings substantially spaced apart from each other to create jets of air flowing into combustion chamber to agitate the contents thereof to facilitate vaporization, an exhaust chamber, an exhaust valve interposed between and concentric with the internal combustion chamber and the exhaust chamber, and a fuel nozzle positioned to direct the flow of fuel onto the interior surface of the exhaust valve, whereby vaporization is facilitated by the valve and grate members.

12. In an internal combustion engine, the combination with an expansion chamber and a combustion chamber contained within and spaced apart from the expansion chamber at one end thereof, of a fuel nozzle spark attachment comprising a shell member extending through the walls of the expansion and combustion chambers and terminating in the latter chamber, and having an insulated member eccentrically located in the shell, and having a fuel channel eccentrically located in the shell, adapted to lower the temperature of the fuel nozzle and to increase the temperature of the fuel passing through the fuel channel, for the purposes described.

13. In an internal combustion engine, a cylinder, a crank case, a piston having an annular deflector substantially inwardly offset from and concentric with the circumference of the piston, said deflector having spaced openings in the lower portion thereof for the passage of scavenging air exterior to the deflector, and a valve adapted to cover said openings and operated by crank case compression.

14. A cylinder for two cycle engines without port openings in walls, including a combustion chamber located within the cylinder and sufficiently spaced apart therefrom to admit of complete scavenging of air space intervening between walls of combustion chamber and of cylinder, an air cooled piston, and means for the passage of air through the piston in a position and direction to impinge against the cylinder walls.

15. In an internal combustion engine, a piston, packing rings, the piston having annular valve covered ports therethrough positioned substantially adjacent to the circumferential portion of the piston to cool the piston and piston packing rings contained therein, a deflector having valve-controlled openings therein, an annular valve angular in cross section and adapted to control all of the aforesaid ports and to evenly distribute the air passing through the piston valve ports, whereby to effect complete and uniform scavenging and facilitate lubrication.

16. In an internal combustion engine, a cylinder, a crank case, a piston having ports extending longitudinally therethrough in proximity to piston packing rings to provide cooling means, a valve means for automatically reseating the valve, an offset annular deflector having its outer walls substantially reduced in circumference from that of the piston and projecting from the head of the piston to assist in the retention of an air stratum adjacent the walls of expansion chamber during downstroke of piston, openings through the base of the deflector positioned to be closed by abovementioned valve and automatically opened by crank case compression, and packing rings in the piston.

17. In an internal combustion engine, the combination of an expansion chamber, a piston in said chamber having a longitudinally extending deflector positioned to project substantially midway between the expansion chamber and the walls of the combustion chamber at the end of the piston stroke the deflector having valve-controlled openings, a combustion chamber contained within and mounted at one end of the aforesaid expansion chamber and spaced apart therefrom to maintain annular air strata adjacent to the walls of the respective chambers to cause the products of combustion and the increased pressure of the air strata by the absorption of heat to exert power on a common piston.

18. In an internal combustion engine, the process of compressing an additional supply of air in an expansion chamber directly adjacent and surrounding the combustion chamber the air containing no fuel gases, and completing combustion in the combustion chamber without burning any of the oxygen from the additional supply of air surrounding the combustion chamber, whereby to relieve the walls of the cylinder from the customary excess heat of combustion.

19. In an internal combustion engine, the process of completely scavenging the cylinder and the combustion chamber of the products of combustion with air free from fuel gases, and retaining a portion of the scavenging air adjacent the outer exposed surface of the exhaust valve for cooling purposes, substantially as described.

THOMAS B. SLATE.

Witnesses:
 CHAS. E. BRECKOUS,
 LESTER L. SARGENT.